United States Patent [19]

Brown

[11] Patent Number: 5,949,389
[45] Date of Patent: Sep. 7, 1999

[54] IMAGING SYSTEM

[75] Inventor: Douglas Brown, Dumbarton, United Kingdom

[73] Assignee: University of Strathclyde, Scotland, United Kingdom

[21] Appl. No.: 08/749,104

[22] Filed: Nov. 14, 1996

[30] Foreign Application Priority Data

Nov. 15, 1995 [GB] United Kingdom ............... 9523422

[51] Int. Cl.$^6$ ..................................... G09G 5/00
[52] U.S. Cl. .................... 345/9; 345/6; 345/31; 345/425; 359/462; 359/479
[58] Field of Search ..................... 345/9, 1, 2, 6, 345/7, 32, 4, 31, 419, 425; 349/5, 6, 11; 359/479, 462

[56] References Cited

U.S. PATENT DOCUMENTS

| | | | |
|---|---|---|---|
| 4,130,832 | 12/1978 | Sher | 348/44 |
| 4,607,255 | 8/1986 | Fuchs et al. | 345/31 |
| 4,670,744 | 6/1987 | Buzak | 345/6 |
| 4,736,110 | 4/1988 | Awamura | 250/201.4 |
| 5,148,310 | 9/1992 | Batchko | 359/479 |
| 5,220,452 | 6/1993 | Anderson | 359/462 |
| 5,231,538 | 7/1993 | Anderson | 359/462 |

FOREIGN PATENT DOCUMENTS

| | | |
|---|---|---|
| 0 271 650 | 6/1988 | European Pat. Off. |
| 562334 | 6/1944 | United Kingdom . |
| 592367 | 9/1947 | United Kingdom . |
| 652649 | 4/1951 | United Kingdom . |
| 2 000 880 | 1/1979 | United Kingdom . |

OTHER PUBLICATIONS

Applied Optics—"Digital Control of Focal Distances", vol. 6, No. 3, Mar. 1967, pp. 549–551.

Applied Optics—"3–D Computer–Generated Movies Using a Varifocal Mirror", vol. 7, No. 8, Aug. 1968, pp. 1505–1511.

Applied Optics—"Varifocal Mirror Technique for Video Transmission of Three–Dimensional Images", vol. 9, No. 9, Sep. 1970, pp. 2035–2039.

Applied Optics—"Experimental Demonstration of Optical Sectioning by Spatial Filtering and Its Possible Use in Transmission of Three–Dimensional Pictures", vol. 10, No. 4, Apr. 1971, pp. 862–867.

Applied Optics—"Microscope with Enhanced Depth of Field and 3–D Capability", vol. 12, No. 10, Oct. 1973, pp. 2509–2519.

Optic Letters—Real–time volume–scanning three–dimensional imaging system fro real moving objects, vol. 6, No. 3, Mar. 1981, pp. 105–107.

Lasers & Optronics—"News", Oct. 1988, pp. 28 and 32.

Journal Of The Optical Society Of America—"Common–Path Interferometer for Testing Purposes", vol. 47, No. 5, May 1957, pp. 386–390.

Waverly Gold Medal Essay Competition—"The Solid Image Microscope", by R.L. Gregory, pp. 422–427.

Space/Aeronautics—"Concepts and Requirements", Sep. 1962, pp. 60–65.

*Primary Examiner*—Jeffery A. Hofsass
*Assistant Examiner*—Davetta Woods
*Attorney, Agent, or Firm*—Alston & Bird LLP

[57] ABSTRACT

A method of producing a three-dimensional image comprises the steps of: sequentially producing images of depth plane contours of an object by tracing the images representative of the contours in each plane; and projecting the contour images onto a moving screen to display the images at an appropriate point in space. The rate of production of the contour images is more rapid than can be discerned by the human eye such that persistence of vision creates an apparently solid three-dimensional image of the object.

36 Claims, 2 Drawing Sheets

IMAGING SYSTEM

FIELD OF THE INVENTION

This invention relates to an imaging system and in particular to a system for producing three-dimensional images.

BACKGROUND OF THE INVENTION

It is known to produce three-dimensional images of objects from two dimensional images displayed on a cathode ray tube (CRT) screen by sequentially displaying depth planes or "slices" of an object on the screen on a frame-by-frame basis. The slices are projected onto a moving screen which is synchronised with the screen images such that the projected slices appear at the appropriate point in space relative to each plane of the original object. Persistence of vision enables a viewer to see an apparently solid but translucent object constructed from the various slices. Examples of such systems are described, for example, in U.S. Pat. No. 4,607,255 (Fuchs et al), U.S. Pat. No. 4,462,044 (Thomason et al), UK Patent Application No. 2 000 680 A (Sher) and European Patent Application No. 0 271 650 A1 (Muckerheide).

In these existing systems the slice images are created by conventional raster displays, that is each image is created in a raster frame made up of a large number of raster lines with selected points or spots on selected lines being illuminated such that the spots collectively create the desired image on the screen. The creation of each raster frame requires a relatively long time period (16.67 mS at a 60 Hz refresh rate) such that, in practice, it has proved difficult to produce the number of slice images necessary to create a three-dimensional image of any depth or resolution within the short period necessary to create a solid non-flickering image. Proposals have been made to increase the frame or refresh rate to a higher level (such as 120 Hz) to overcome this problem, however the volume of data which must be processed to produce this number of frames requires provision of relatively sophisticated, and therefore expensive, computer systems.

These difficulties do not arise where an actual object is available, and there have been a number of examples in which reflected three-dimensional images of real objects have been created. In *Research* 1960, Gregory used a moving lens to focus sharply through each of the planes of an object and was able to view the resulting solid images on a revolving spiral mirror. However, the most pressing need is for a system which will display electronically created or processed images in three-dimensions.

Three-dimensional viewing systems utilising head mounted displays (HMDs) are available, however these produce small images of relatively poor resolution and have a restricted field of view. Further, as the HMD must be fixed relative to the viewer's head it is not possible to view a "stationary" image from different angles, and the image must be viewed in isolation from other viewers.

Accordingly, there is a need for a system which will permit computer generated objects to be viewed in three-dimensions and occupy a real image space. Such a system would be particularly useful in computer aided design (CAD), allowing designers to view a real image of, for example, a computer generated motor vehicle body.

SUMMARY OF THE INVENTION

According to the present invention there is provided an imaging system including: means for sequentially producing images of depth plane contours of an object by tracing the images representative of the contours in each plane; and a movable screen, the positioning of which is matched to the production of images by the image producing means for sequentially displaying said images at an appropriate point in space, the rate of production of said images being more rapid than can be discerned by the human eye whereby persistence of vision creates an apparently solid three-dimensional image of the object.

According to another aspect of the invention there is provided a method of producing a three-dimensional image, the method comprising: sequentially producing images of depth plane contours of an object by tracing the images representative of the contours in each plane; and projecting the images onto a moving screen to display said images at an appropriate point in space, the rate of production of said images being more rapid than can be discerned by the human eye whereby persistence of vision creates an apparently solid three-dimensional image of the object.

In use, tracing only the images representative of the depth plane contours of an object allows a large number of such planes to be represented within a short period of time as the time required to trace each image is relatively short, in contrast to conventional CRT displays using raster scans which require an entire screen frame to be produced for each depth plane. Further, tracing only a contour image facilitates creation of object images having apparently solid outer skins.

Preferably, the image producing means is in the form of one or more lasers or other focused light sources, which may be manipulated to produce monochrome or full colour images. The light beam or spot produced may be manipulated to trace the appropriate contour images by one or more optical devices, including mirrors or solid state reflecting devices, such as acoustic optical elements (AOEs) of other devices to describe any prescribed 360° contour image. Conveniently, for conformity with existing technology, such as existing computer aided design (CAD) and computer aided interactive design (CAID) software packages, two optical devices are provided, each for reflecting the beam in relative orthogonal planes, that is one for controlling the deflection of the beam in the Y-direction and the other for controlling the deflection of the beam in the X-direction. The colour saturation or intensity of the source may be modulated by image data to provide, for example, an impression of depth or create areas of light and shadow, and thus produce a more realistic image. Alternatively, an appropriately controlled CRT display or other light emitting means may be utilised.

Preferably also, the screen is in the form of a mirror, most preferably a fixed focus mirror, and which may be a solid state device. Existing systems have utilised varifocal mirrors, which may be used with the present invention if desired. However, a varifocal mirror will produce reflected images of different sizes such that the size of each depth plane contour image traced by the image producing means must be corrected so that the reflected images are all of the same size. Clearly, this increases the complexity involved in creating and displaying an image. The images may be projected directly onto the mirror but in certain cases, particularly when the contour images are created by laser, the contours may first be traced on or projected onto an intermediate screen, for example a ground glass screen, to produce an intermediate image which is visible in the mirror. The mirror may be of many possible contours but is preferably concave to produce an apparently solid image in space. A fixed focus concave mirror also offers the advantage that producing a predetermined movement of the reflected image, for example to locate each sequentially produced contour image at the appropriate point in space, does not require the mirror to move a corresponding distance; the distance between reflected images corresponds to the square of the distance the mirror has moved.

In certain applications it may be desirable to produce "life-size" images of relatively large objects, such as motor vehicles. This may be achieved by, for example, creating a relatively small image in front of a moving concave mirror, reflecting this image using a magnifying mirror, of convex or concave form, and then reflecting the magnified image using a further magnifying mirror of concave form. This arrangement may be used to create large three-dimensional images in space. Further, by changing the contour of the concave mirror it is possible to produce a larger image close to the mirror or a smaller image further from the mirror. In another arrangement, a relatively small image is created in front of a magnifying lens which magnifies the image. The magnified image is reflected by a first concave mirror and the reflected magnified image reflected by a second concave mirror. The resulting real image may be considerably larger than the original image and may occupy a volume of space remote from the original image. Of course other magnifying arrangements may be utilised to suit particular applications.

Preferably also, the image producing means produces polarised light and an oppositely polarised filter is located in the plane of the created image such that any of the image viewed through the filter is not visible. This assists in the creation of a "solid" or non-transparent image, as the contours which have been projected onto the screen but which would be hidden in the "real" image are not seen. This effect may be accomplished for all viewing aspects by utilising a polarised or other dynamic filtering device: for example, by providing a filter rotating around an axis in the centre of the created image this effect may be maintained as the viewer changes his or her point of view relative to the image.

According to a further aspect of the present invention there is provided a magnification system comprising: a magnifying lens for magnifying a first image to produce a magnified image; a first mirror for reflecting the magnified image to produce a reflected magnified image; and a concave second mirror for reflecting the reflected magnified image to produce a real magnified image of the first image.

According to a still further aspect of the invention there is provided a magnification method comprising the steps:

creating a first image in front of a magnifying lens to produce a magnified image;

reflecting the magnified image using a first mirror to produce a reflected magnified image; and reflecting the reflected magnified image using a concave second mirror to produce a real magnified image of the first image.

The resulting real image may be considerably larger than the first image and may occupy a volume of space remote from the first image. The use of a magnifying lens allows the producing much sharper images than in systems in which mirror are utilised to provide differing degrees of magnification; in systems in accordance with the invention the lens may provide the majority of magnification and indeed the mirrors may be utilised solely for transferring the magnified image.

Preferably, the system configuration and dimensions are selected such that all of the light reaching the first mirror is retained across the real magnified image.

Preferably also, the mirrors are symmetrical and tilted towards one another, substantially reducing the distortion of the real magnified image. Most preferably, the mirrors are off-axis mirrors, that is the images to be reflected are not on the respective mirror central axes, further reducing distortion.

Preferably also, the mirrors are of variable curvature, and most preferably the mirrors are adjustable flexible membrane mirrors, such as described in U.S. Pat. No. 5,109,300, the disclosure of which is incorporated herein by reference.

In one embodiment, the first image may be provided in distortion correction format, such that the resulting real magnified image appears free from distortion.

BRIEF DESCRIPTION OF THE DRAWINGS

These and other aspects of the invention will now be described, by way of example, with reference to the accompanying drawings, in which.

DETAILED DESCRIPTION OF THE DRAWINGS

Figure 1:
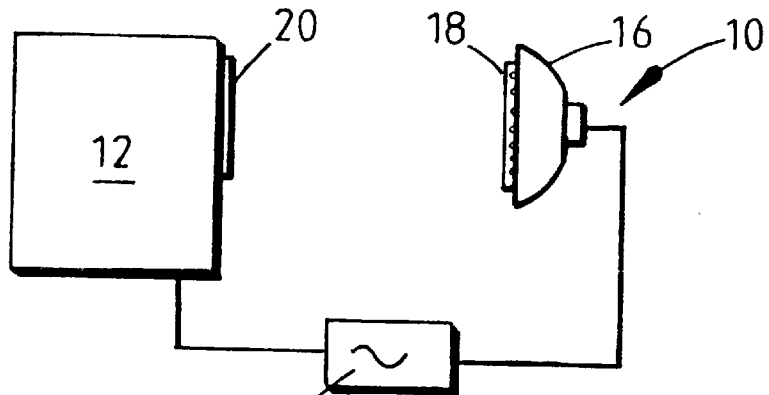
FIG. 1 is a schematic representation of an imaging system in accordance with a first embodiment of the present invention.

Reference is first made to FIG. 1 of the drawings, which illustrates an imaging system 10 in accordance with a first embodiment of the present invention. The system 10 includes an oscilloscope 12, a signal generator 14 and a loudspeaker 16 with a fixed focus mirror is mounted on the movable cone thereof. The electron beam of the oscilloscope 12 is deflected by X and Y drives simultaneously provided with a sine wave and a cosine wave input so that a closed loop line image (a Lissajoux figure) is formed such that the images traced on the oscilloscope screen 20 are in the form of a series of circles. As will be described, this figure is utilised to create a three-dimensional image of a cylinder.

The loudspeaker 16 is driven by the signal generator 14, which is linked to the oscilloscope 20. The system 10 is arranged such that the loudspeaker vibrates to place the fixed focus mirror 18 at an appropriate point in space so that the reflections of the circles appearing on the oscilloscope screen 20 will appear at sequential spaced points in space such that persistence of vision creates an apparently solid three-dimensional image of a cylinder. The image created by the moving mirror is in fact a helix however the reflected images are so closely spaced that this is not apparent to the human eye. Similarly, by controlling the oscilloscope drives to form a figure of reducing or increasing diameter it is possible to create three-dimensional images of cones and spheres. It is also possible to create an image which appears to carry a pattern on its surface by, for example, placing a transparency between the oscilloscope screen 20 and the mirror 18, this resulting in the image carried by the transparency apparently wrapping itself around the three-dimensional image.

This first embodiment is clearly of fairly limited application, and a preferred embodiment of the invention with wider application will now be described with reference to FIG. 2 of the drawings. The illustrated system 30 includes a computer 32 which may run appropriate computer aided design (CAD), or computer aided interactive design (CAID), and image generating software. The image producing means is in the form of a monochrome laser 34 which is deflected in the Y and X planes by appropriate acoustic optical elements (AOEs) 36, 37. The deflection produced by the AOEs 36, 37 is controlled by the computer 32 in accordance with contour image data stored therein to produce tracings of depth plane contours of a particular computer generated or processed image. In this example the sequence of image contours is projected onto a ground glass screen 38. The images created on the screen 38 are then reflected by a moving fixed focus acoustic optical device 40, the movement of the device 40 being synchronised with the production of the depth plane contour images by the computer 32 such that the contour images are displayed at an appropriate point in space and thus, through persistence of vision, create an apparently solid three-dimensional image of the object. In this particular example a device 40 which reflects in a similar manner to a concave mirror is utilised to create a "real" (as opposed to virtual) image of the object in real space. The image is perceived as a solid object from all aspects (other than from the "rear") and may be viewed in a manner consistent with looking at a real three-dimensional object occupying a real volume in space. Thus, the image may be viewed simultaneously by a large number of viewers. Under appropriate computer or operator control, the image may be dynamically modified, for example the image be caused to rotate, or change in size, colour, shape or detail. As the contour images contain no "internal" data content the resulting three-dimensional images appear solid and the images may be controlled to provide the appearance of a reflecting outer skin. Of course, it may be possible to create "internal" data when desired, if necessary by utilising a further image producing means synchronised with the existing laser 34 and device 40.

As the image is constructed solely on a contour-by-contour basis, rather than a frame-by-frame basis, a large number of depth planes may be represented, typically in excess of 1,000 planes being created and displayed. This system may also have a fast refresh rate, in excess of 120 per second. Those of skill in the art will recognise that these advantages are gained by the zero image redundancy achieved by the above described systems, which substantially reduces the data that must be processed and the time required to display the image represented by the data when compared to existing systems utilising raster scan fields or frame stores processed by X, Y co-ordinate and intensity values with point plotting routines to describe each two dimensional slice or contour image.

For the monochrome system 30 described above, the computer 32 produces the contour or profile tracing of each slice by controlling: the laser contrast; the contour data in the X and Y planes for controlling the AOEs 36, 37; and the synchronisation commands to the movable mirror device 40. A somewhat similar system may also be utilised to create colour images, in which the outputs of red, green and blue light sources are passed through a combining element with the output of each individual light source being controlled by the appropriate image colour data from the computer 32. The above description is primarily concerned with the creation of images of surfaces having "depth", however it is also possible to describe a flat surface by maintaining the plane position at which the surface occurs, that is holding the device 40 in the desired position, until the total area is described by, for example, reducing the outer contour successively to fill the flat surface space, Detail may be "drawn" on this flat surface by modulating the intensity of the flying spot.

It should be noted that the references to depth planes herein are not intended to limit the invention to applications in which object images will be viewed from a particular aspect, and that the planes may be taken in any appropriate direction through an object, including vertical and longitudinal planes.

It will be clear to those of skill in the art that the systems described above overcome many of the problems associated with creating three-dimensional images using conventional two-dimensional raster scan CRT displays.

Figure 2:
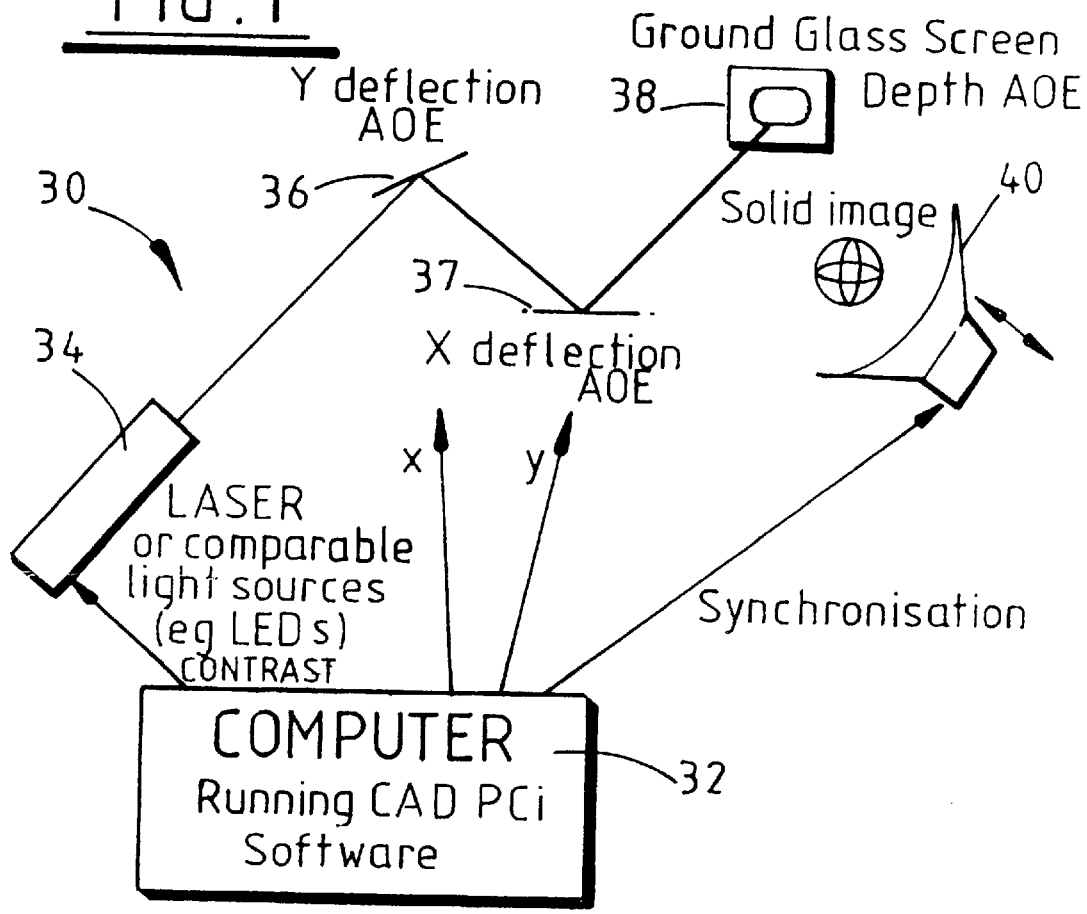
FIG. 2 is a schematic representation of an imaging system in accordance with a preferred embodiment of the present invention.
Figure 3:
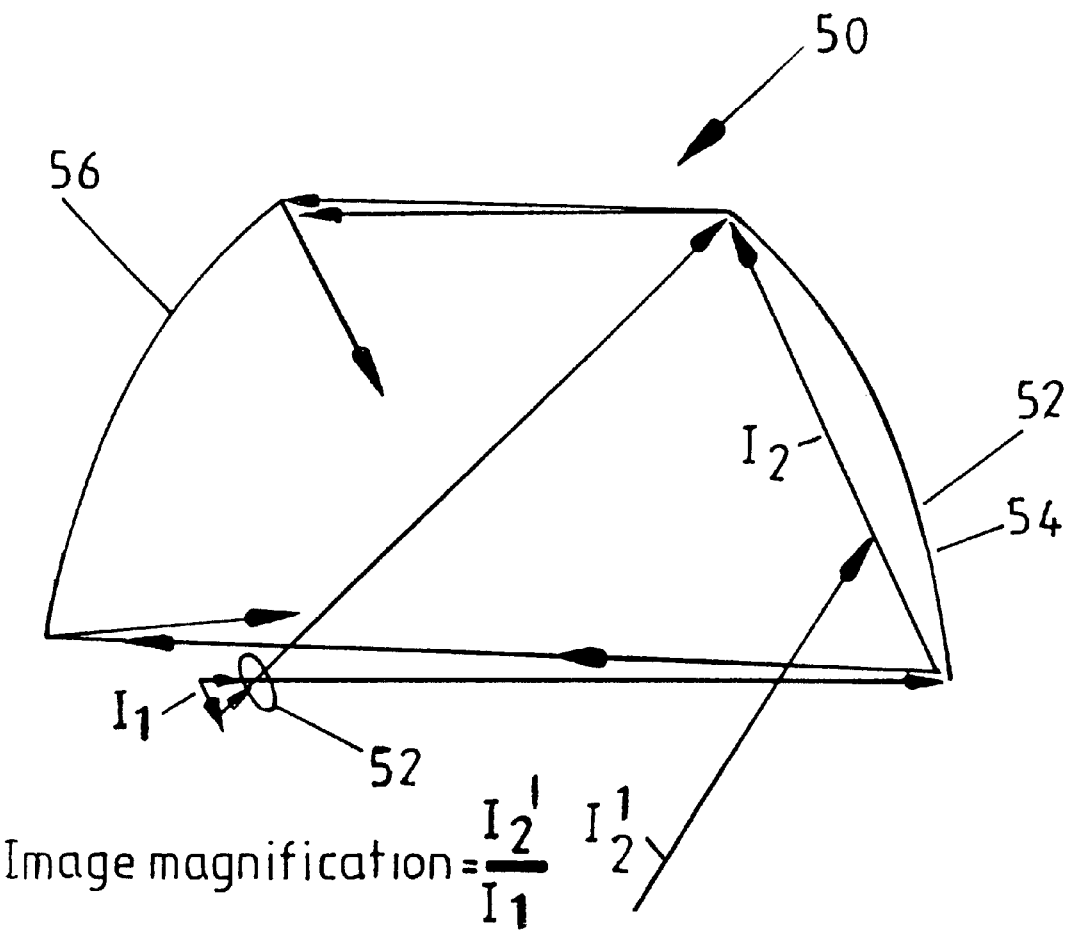
FIG. 3 is a schematic representation of a magnification system in accordance with a preferred embodiment of a further aspect of the present invention, for use with the imaging system of FIG. 2.

Reference is now made to FIG. 3 of the drawings, which is a schematic representation of a magnification system 50 in accordance with a preferred embodiment of a further aspect of the present invention, for use with the imaging system 30 of FIG. 2, and in particular for magnifying the apparently solid three-dimensional image produced by the system. This real image $I_1$, as created in front of the device 40 (not shown in FIG. 3), is produced adjacent a magnifying lens 52 to create a magnified image $I_2$ in the vicinity of or on a first concave mirror 54. The image $I_2$ is transferred from the mirror 54 by a second concave mirror 56 and reimaged as new real image $I_2'$. The configuration dimensions are such that all the light reaching the mirror 54 is retained across the image $I_2'$. Further, tilting the symmetrical mirrors 54, 56 towards one another, as illustrated, substantially reduces the distortions introduced by the mirrors into the final image $I_2'$. Distortion is further reduced by configuring the mirrors 54, 56 as off-axis mirrors; the mirrors 54, 56 are in the form of membrane mirrors as described in U.S. Pat. No. 5,109,300, and thus are readily distorted to provide off-axis imaging units.

The system allows small three dimensional images to be magnified by predetermined and substantial values to produce larger real images which occupy a volume in space remote from the original. The use of the lens to provide magnification allows the mirrors to be used predominantly or exclusively as imaging devices, that is providing little or no magnification, such that the result image is much sharper than a corresponding image created by magnifying mirrors.

Although the system introduces only minimal distortion, this may be eliminated from the final image $I_2'$ by providing the original image $I_1$ in a distortion correction format, such that the final image $I_2'$ appears free from distortion.

The magnification system 50 is described above for use in conjunction with the imaging system 30, although it will be clear to those of skill in the art that the system is suitable for use in many different applications and may be used to magnify real objects as well as electronically produced or processed images.

It will further be apparent to those of skill in the art that the above-described embodiments are merely exemplary of the different aspects of the present invention, and that various modifications and improvements may be made thereto without departing from the scope of the invention.

I claim:

1. An imaging system including:

means for sequentially producing images of depth plane surface contours of an object including a vector plotting display for tracing only the images representative of the depth plane surface contours in each plane;

a movable screen; and means for matching the positioning of the screen to the production of images by the image producing means for sequentially displaying said images on the screen at an appropriate point in space, the rate of production of said images being more rapid than can be discerned by the human eye whereby persistence of vision creates an apparently solid three-dimensional image of the object.

2. The system of claim 1, wherein the image producing means includes: a focused light source for producing a light beam; and an optical device for manipulating the light beam to trace appropriate contour images.

3. The system of claim 2, wherein the light source is a laser.

4. The system of claim 2, wherein a plurality of light sources are provided.

5. The system of claim 4, wherein the light sources provide light of different colours and means are provided to manipulate the light sources to produce full colour images.

6. The system of claim 2 wherein a plurality of optical devices are provided.

7. The system of claim 2, wherein the optical device is a mirror.

8. The system of claim 2, wherein the optical device is a solid state reflecting device.

9. The system of claim 8, wherein the optical device is an acoustic optical elements (AOE).

10. The system of claim 6, wherein two optical devices are provided, each for reflecting the light beam in relative orthogonal planes.

11. The system of claim 2 wherein means are provided for modulating one of colour saturation and intensity of the light source by image data.

12. The system of claim 1 wherein the image producing means includes a CRT display.

13. The system of claim 1, wherein the screen is a mirror.

14. The system of claim 13, wherein the screen is a fixed focus mirror.

15. The system of claim 13, wherein the screen is a solid state device.

16. The system of claim 13, wherein contour images are projected directly onto the mirror.

17. The system of claim 13, wherein the contour images are traced on an intermediate screen to produce an intermediate image which is visible in the mirror.

18. The system of claim 13, wherein the mirror is concave, to produce an apparently solid image in space.

19. The system of claim 13, wherein the mirror is a fixed focus concave mirror.

20. The system of claim 1, in combination with an image magnification system.

21. The system of claim 20, wherein the image magnification system includes a first magnifying mirror for providing a magnified image and a second magnifying mirror of concave form for reflecting the magnified image to create a larger three-dimensional image in space.

22. The system of claim 20, wherein the second magnifying mirror defines an adjustable contour.

23. The system of claim 20, wherein the image magnifying system comprises: a magnifying lens for magnifying the apparently solid three-dimensional first image of the object to produce a magnified image; a first mirror for reflecting the magnified image to produce a reflected magnified image; and a concave second mirror for reflecting the reflected magnified image to produce a real magnified image of the first image.

24. The system of claim 1, wherein the image producing means produces polarised light and an oppositely polarised filter is located in the plane of the apparently solid three-dimensional created image of the object such that any is of the image viewed through the filter is not visible.

25. The system of claim 24, wherein the filter is rotatable around an axis in the centre of the created image.

26. A method of producing a three-dimensional image, the method comprising:

sequentially producing images of depth plane surface contours of an object by tracing by vector plotting the images representative of the depth plane surface contours in each plane; and projecting the images onto a moving screen to display said images at an appropriate point in space, the rate of production of said images being more rapid than can be discerned by the human eye whereby persistence of vision creates an apparently solid three-dimensional image of the object.

27. A magnification system comprising: a magnifying lens for magnifying a first image to produce a magnified image; a first mirror for reflecting the magnified image to produce a reflected magnified image; and a concave second mirror for reflecting the reflected magnified image to produce a real magnified image of the first image.

28. The system of claim 27, wherein all of the magnification is provided by the magnifying lens.

29. The system of claim 27, wherein the system configuration and dimensions are selected such that all of the light reaching the first mirror is retained across the real magnified image.

30. The system of claim 27, wherein the mirrors are symmetrical and tilted towards one another.

31. The system of claim 27, wherein the mirrors are off-axis mirrors.

32. The system of claim 27, wherein the mirrors are of variable curvature.

33. The system of claim 32, wherein the mirrors are adjustable flexible membrane mirrors.

34. A magnification method comprising the steps:

producing a first image in front of a magnifying lens and creating a magnified image;

reflecting the magnified image using a first mirror to produce a reflected magnified image; and reflecting the reflected magnified image using a concave second mirror to produce a real magnified image of the first image.

35. An imaging system including:

means for sequentially producing images of axially spaced depth plane contours of an object by tracing the images representative of the contours in each plane;

a linearly movable screen; and means for matching the positioning of the screen to the production of images by the image producing means for sequentially displaying said images on the screen at an appropriate point in space, the rate of production of said images being more rapid than can be discerned by the human eye whereby persistence of vision creates an apparently solid three-dimensional image of the object.

36. An imaging system including:

means for sequentially producing images of depth plane contours of an object by tracing images of depth plane contours of an object by tracing the images representative of the contours in each plane;

a movable concave mirror screen; and means for matching the positioning of the screen to the production of images by the image producing means for sequentially displaying said images as real images in front of the screen at an appropriate point in space, the rate of production of said images being more rapid than can be discerned by the human eye whereby persistence of vision creates an apparently solid real three-dimensional image of the object.

* * * * *